United States Patent
Nissan et al.

(10) Patent No.: US 9,607,618 B2
(45) Date of Patent: Mar. 28, 2017

(54) OUT OF VOCABULARY PATTERN LEARNING

(71) Applicant: NICE-SYSTEMS LTD, Ra'anana (IL)

(72) Inventors: Maor Nissan, Herzeliya (IL); Ronny Bretter, Kiriyat Motzkin (IL)

(73) Assignee: NICE-SYSTEMS LTD, Ra'anana (IL)

( * ) Notice: Subject to any disclaimer, the term of this patent is extended or adjusted under 35 U.S.C. 154(b) by 0 days.

(21) Appl. No.: 14/571,347

(22) Filed: Dec. 16, 2014

(65) Prior Publication Data

US 2016/0171973 A1    Jun. 16, 2016

(51) Int. Cl.
- *G10L 15/183* (2013.01)
- *G10L 15/187* (2013.01)
- *G10L 15/14* (2006.01)

(52) U.S. Cl.
CPC .......... *G10L 15/183* (2013.01); *G10L 15/146* (2013.01); *G10L 15/187* (2013.01)

(58) Field of Classification Search
CPC ... G10L 15/00; G10L 15/01; G10L 2015/025; G10L 15/065; G10L 2015/088; G10L 15/146; G10L 15/187; G10L 15/26
USPC ............... 704/1–10, 200, 231, 235, 250–256
See application file for complete search history.

(56) References Cited

U.S. PATENT DOCUMENTS

| 6,226,612 B1 | 5/2001 | Srenger et al. | |
| 6,389,395 B1 * | 5/2002 | Ringland | G10L 15/063 704/242 |
| 6,574,595 B1 * | 6/2003 | Mitchell et al. | G10L 15/22 704/242 |

(Continued)

OTHER PUBLICATIONS

Hamed Ketabdar, Mirko Hannemann and Hynek Hermansky. "Detection of Out-of-VocabularyWords in Posterior Based ASR". http://www.iikt.ovgu.de/iesk_media/downloads/ks/publications/papers/2007/interspeech_2007_mh.pdf.

(Continued)

*Primary Examiner* — Huyen Vo
*Assistant Examiner* — Rodrigo Chavez
(74) *Attorney, Agent, or Firm* — Soroker Agmon Nordman

(57) ABSTRACT

A method for adapting a speech recognition system for out-of-vocabulary, comprising, decoding by a hybrid speech recognition a speech including out-of-vocabulary terms, thereby generating graphemic transcriptions of the speech with a mixture of recognized in-vocabulary words and unrecognized sub-words, while keeping a track of the decoded segments of the speech, determining in the transcription sequences of sub-words as candidate out-of-vocabulary words based on a first condition with respect to lengths of the sequences of sub-words and a second condition with respect to the number of repetitions of the sequences, audibly presenting to a user the candidate out-of-vocabulary words from the corresponding segments of the speech according to the track, and receiving from the user indications of valid words corresponding to audible presentations of the sequences of sub-words in the candidate out-of-vocabulary words, and training a speech recognition to additionally recognize the candidate out-of-vocabulary words, thereby adapting the speech recognition to recognize out-of-vocabulary words, wherein the method is performed on an at least one computerized apparatus configured to perform the method, and an apparatus for performing the same.

7 Claims, 2 Drawing Sheets

(56) References Cited

U.S. PATENT DOCUMENTS

| | | | |
|---|---|---|---|
| 2002/0138265 A1* | 9/2002 | Stevens et al. | G10L 15/22 704/251 |
| 2003/0187643 A1 | 10/2003 | Van Thong et al. | |
| 2006/0074664 A1* | 4/2006 | Lam et al. | G10L 15/142 704/255 |
| 2008/0172224 A1* | 7/2008 | Liu et al. | G10L 15/187 704/220 |
| 2008/0205767 A1* | 8/2008 | Hoshino et al. | G03F 7/70791 382/192 |
| 2013/0275138 A1* | 10/2013 | Gruber et al. | G10L 13/00 704/260 |
| 2014/0297252 A1* | 10/2014 | Prasad et al. | G06F 17/289 704/2 |
| 2015/0058006 A1* | 2/2015 | Proux | G10L 15/26 704/235 |

OTHER PUBLICATIONS

A. Rastrow, A. Sethy, and B. Ramabhadran. A new method for OOV detection using hybrid word/fragment system. pp. 3953-3956, 2009a.

* cited by examiner

OUT OF VOCABULARY PATTERN LEARNING

BACKGROUND

The present disclosure generally relates to speech recognition, and more specifically to learning out-of-vocabulary words with a user feedback.

Handling of out-of-vocabulary words in speech recognition systems is known in the art.

For example, U.S. Pat. No. 6,226,612 that reports calculating, within the framework of a speaker dependent system, a standard filler, or garbage model, for the detection of out-of-vocabulary utterances, or US Application 2003/0187643 that reports subword decoder and a dictionary lookup to process a spoken input, or http://kww.iikt.ovgu.de/iesk_media/downloads/ks/publications/papers/2007/interspeech_2007_mh.pdf; or A. Rastrow, A: Sethy, and B. Ramabhadran. A new method for OOV detection using hybrid word/fragment system. pages 3953-3956, 2009a.

Handlings of out-of-vocabulary words is also further known in the art, as can be found, for example, in the following publications:
  http://www.cs.cmu.edu/~lqin/cmu_files/icassp2012.pdf;
  http://www.busim.ee.boun.edu.tr/~speech/publicatiorns/Speech_Recognition/icassp04ali.pdf, or
  http://homes.esat.kuleuven.be/~konijn/DIRAC/DIRAC_WS. pdf;

SUMMARY

One exemplary embodiment of the disclosed subject matter is a method for adapting a speech recognition system for out-of-vocabulary words, comprising, decoding by a hybrid speech recognition a speech including out-of-vocabulary terms, thereby generating graphemic transcriptions of the speech with a mixture of recognized in-vocabulary words and unrecognized sub-words, while keeping a track of the decoded segments of the speech relative to an audio DB, determining in the transcription sequences of sub-words as candidate out-of-vocabulary words based on a first condition with respect to lengths of the sequences of sub-words and a second condition with respect to the number of repetitions of the sequences, audibly presenting to a user the candidate out-of-vocabulary words from the corresponding segments of the speech according to the track, and receiving from the user indications of valid out-of-vocabulary words corresponding to audible presentations of the sequences of sub-words in the candidate out-of-vocabulary sections, and training a speech recognition system to additionally recognize the candidate out-of-vocabulary words, thereby adapting the speech recognition system to recognize out-of-vocabulary words, wherein the method is performed on an at least one computerized apparatus configured to perform the method.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
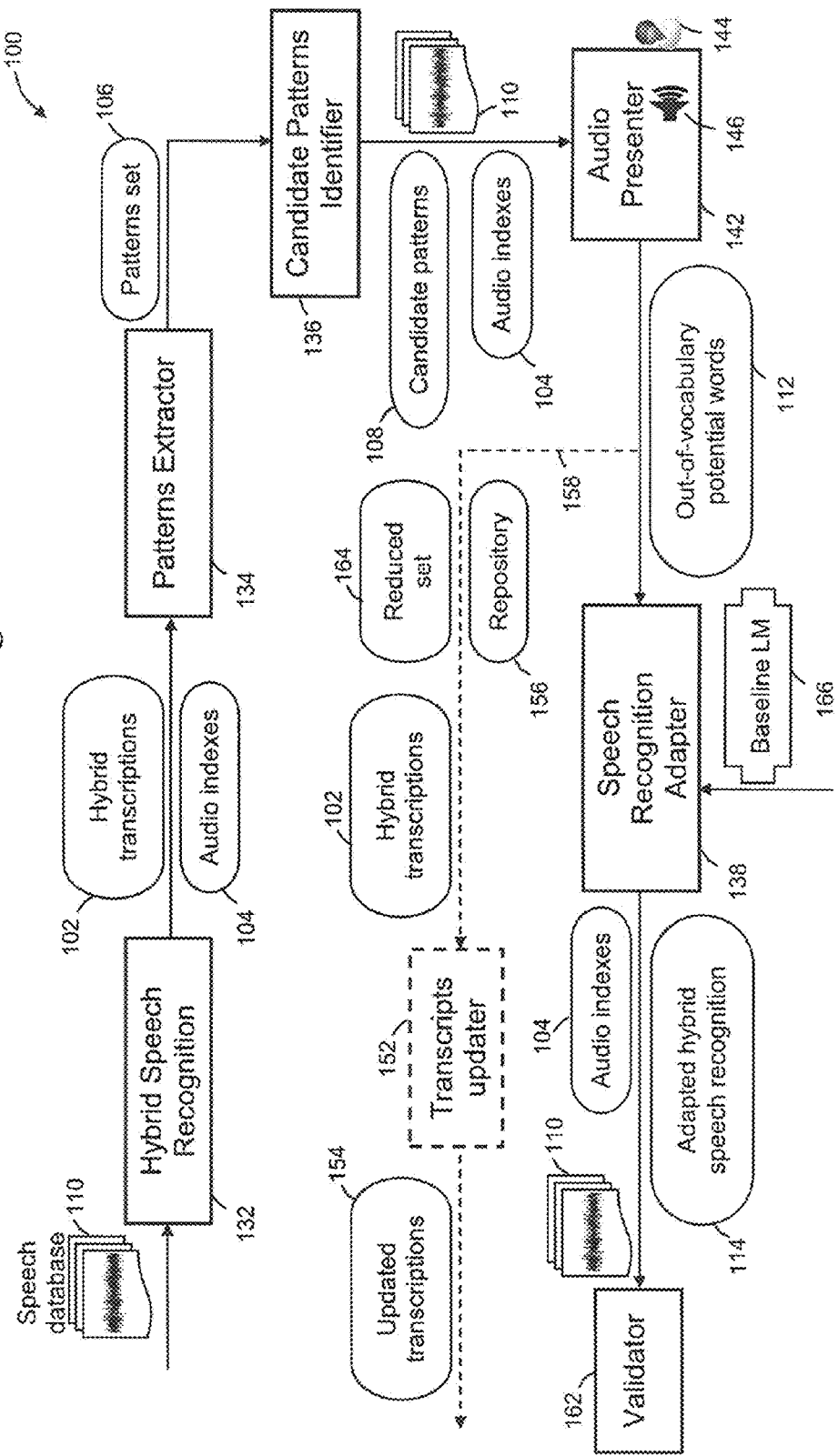

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
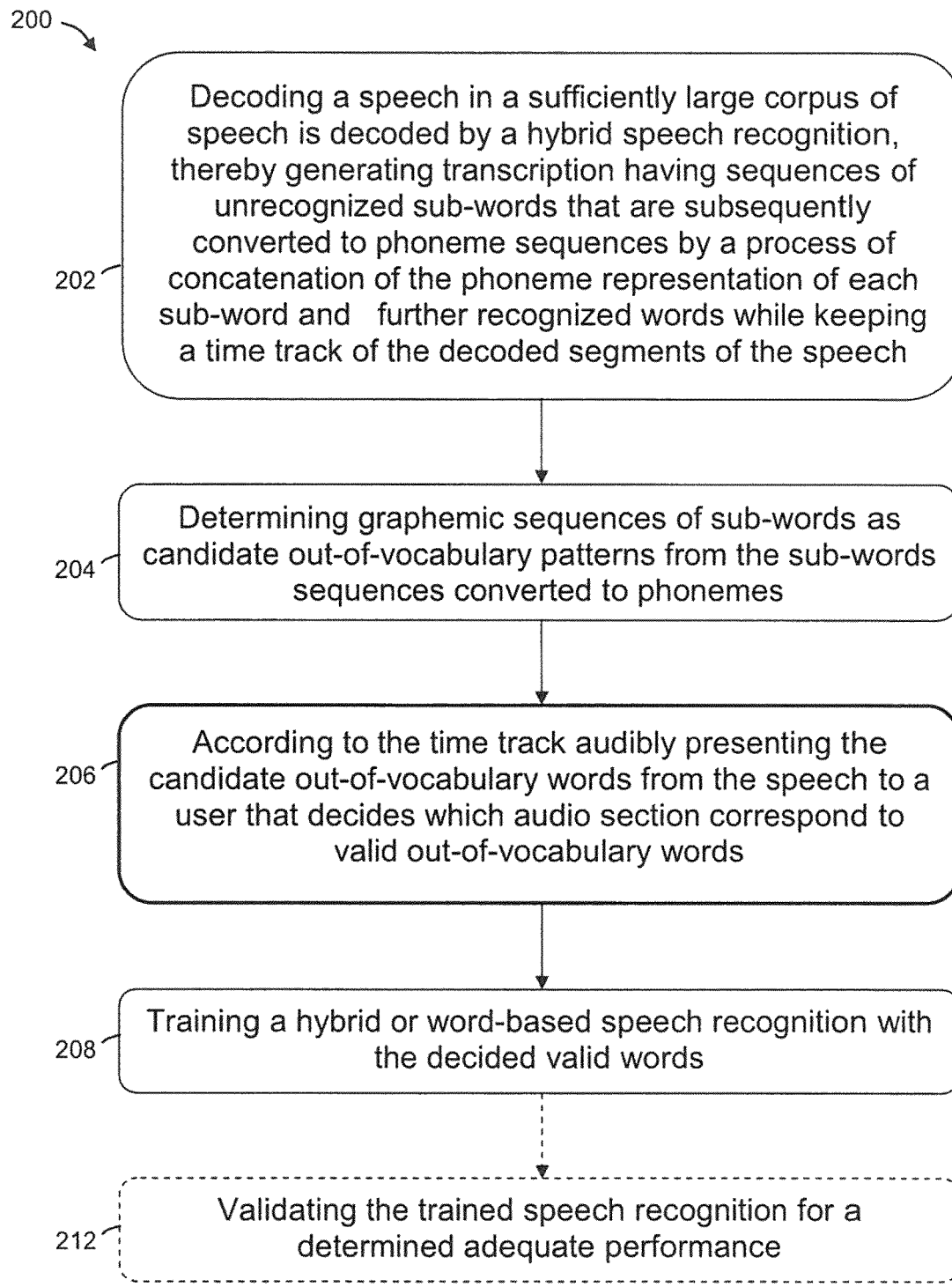

FIG. 1 schematically illustrates a system for adapting a speech recognition system for out-of-vocabulary words, according to exemplary embodiments of the disclosed subject matter; and FIG. 2 outlines operations for adapting a speech recognition system for out-of-vocabulary words, according to exemplary embodiments of the disclosed subject matter.

DETAILED DESCRIPTION

In the context of the present disclosure, without limiting, the term out-of-vocabulary (OOV) implies terms and/or utterances that are not included in a given reference such as a dictionary. Likewise, in the context of the present disclosure, without limiting, the term in-vocabulary implies terms that are included in a given reference such as a dictionary.

Generally, in the context of the present disclosure, without limiting, a 'language model' is any construct reflecting occurrences of words or phrases or terms of a given vocabulary, so that, by employing the language model in a speech recognition system enables to recognize audio that includes words from a pre-defined vocabulary, words or phrases of and/or related to the vocabulary provided to the language model can be recognized, at least to a certain faithfulness.

In the context of the present disclosure, without limiting, a 'baseline language model' or a 'basic language model' imply a language model trained and/or constructed with a vocabulary generally of common everyday phrases and/or unrelated to a particular subject matter and texts in which the distribution of words is generally and/or approximately as common in the respective spoken language.

Without limiting, a language model is a statistical language model where phrases, and/or combinations thereof, are assigned probability of occurrence by means of a probability distribution. Such a model is referred to herein, representing any language model such as known in the art.

In the context of the present disclosure, without limiting, an 'acoustic model' implies a model containing information on the probabilistic mapping between phonemes and acoustic features as statistical representations of the sounds that make up words.

In the context of some embodiments of the present disclosure, without limiting, a 'phonetic dictionary', referred to also as a dictionary, implies a construct such as a table that maps between words and representations of pronunciation thereof as phonetic elements that represent a corresponding pronunciation.

In the context of the present disclosure, without limiting, a 'phonetic model' implies so a speech recognition model that is fitted to recognize speech elements in a phonetical level, a syllable level, a word level or a combination of the cited levels. The recognition output may be in a form of a lattice, N-Best or 1-best or in any suitable manner as known in the art.

In the context of the present disclosure, without limiting, an 'audio database' implies a sufficiently large corpus of speech of one or more speakers. Such a corpus, without limiting, includes hundreds or thousands or speech files and/or documents such as audio files, optionally of a plurality of speakers. In the context of the present disclosure, without limiting, the sufficiently large corpus of speech includes, out-of-vocabulary terms with respect to a given reference such as a baseline language model or a dictionary.

In the context of the present disclosure, without limiting, a 'transcription database' implies a set of transcriptions of speech that are generally indexed or otherwise constructed for rapid detection or retrieval. The transcription database is generally, without limiting, generated based on and/or facilitated by the phonetic model.

In the context of the present disclosure, without limiting and unless otherwise specified, referring to a speech recognition, such as a speech recognition mechanism or a system or an apparatus, implies a mechanism or a system or an apparatus employing an acoustic model which maps probabilistically the speech fragments to acoustic features, a language model which models the probability distribution over sequences of words or phrases, and a phonetic dictionary which maps words to sequences of elementary speech fragments, as known in the art or according thereto. Optionally, the speech recognition employs also a phonetic model which recognizes speech elements in a phonetical level as known in the art or according thereto. The constituents employed by speech recognition as cited above are also referred to as speech recognition components.

In the context of the present disclosure, without limiting, a hybrid speech recognition, such as speech recognition system or apparatus, implies a speech recognition configured to decode sub-words or syllables in addition to a words vocabulary, and that rather than attempting to fit improbable or unlikely words to time regions of a speech of low acoustics or of out-of-vocabulary words. Generally, a hybrid speech recognition system or apparatus is configured by adapting a language model and/or other components involved in the speech recognition for modeling co-occurrence, or probability, of words and sub-words. The output of a hybrid speech recognizer is a sequence combined of words and sub-words. The sequence is also referred to as hybrid transcriptions, which generally are stored in a construct, such as a database, and also referred to a transcriptions DB.

Some examples of training hybrid speech recognition systems are disclosed in C. White, G. zweig, L. Burget, P. Schwarz, and H. Hermansky. Confidence estimation, OOV detection and language ID using phone-to-word transduction and phone-level alignments, or in A. Rastrow, A. Serhy, and B. Ramabhadran. *A new method for OOV detection using hybrid word/fragment system.* pages 3953-3956, 2009a, or in *Learning Our-of Vocabulary Words in Automatic Speech Recognition, PhD thesis* by Long Qin in chapter 3.

In the context of the present disclosure, a speech recognition system or apparatus are also referred to as a 'speech recognition engine', and, likewise, a hybrid speech recognition system or apparatus are also referred to as a 'hybrid speech recognition engine', In the context of the present disclosure, without limiting, referring to a sub-word implies also a syllable and/or one or more phonemes.

In the context of the present disclosure, without limiting and unless otherwise specified, referring to a word implies also phrase of consecutive words.

In the context of the present disclosure, referring to a text to phonemes conversion implies a process of converting letters to sound representations thereof. For example, the textual word ACURA is converted to a graphemic representation _AE_K_Y_AX_R_AX. Examples of text to phonemes conversion can be found in US application 2007/0233490 or in http://leonsplanet.com/phono.htm. For brevity the conversion is also referred to as TTP.

In the context of the present disclosure, without limiting, a 'user' implies a person.

The terms cited above denote also inflections and conjugates thereof.

One technical problem dealt by the disclosed subject matter is adapting a language model, such as a baseline language model, to recognize terms that are not included in the language model when used in a speech recognition apparatus or system.

One technical solution according to the disclosed subject matter is, based on a phonetic model and/or a phonetic dictionary and a suitable acoustic model, decoding to transcripts speech in an audio database while keeping track of the audio segments corresponding to the transcripts, such as timings thereof.

The transcripts may include words as previously defined in the phonetic model and/or phonetic model, and, additionally, may include undefined sub-words such as syllables which are literally or plainly transcribed.

Apart from the defined words, repeated patterns of sub-words are regarded as candidates for potential out-of-vocabulary words, optionally, provided that the patterns so meet conditions with respect to lengths and/or repetitions thereof. For example, patterns having at least a certain length and/or at least certain repetitions are identified or determined as candidate patterns.

Based on the audio segments, at least one of any repeated pattern of candidate sub-words is audibly presented to a user who judges or decides whether the pattern of sub-words is uttered as a valid or non-valid word.

Audibly presented words judged by the user as valid are used to train or update the language model, thereby providing the language model to recognize the correct words when employed in a speech recognition apparatus or system.

In some embodiments, the adapted language model is tested to validate that the adapted language model performs better than a previous language model, such as a baseline language model, in terms or recognizing valid out-of-vocabulary words.

It is noted that the out-of-vocabulary words may be peculiar regarding some circumstances. For example, relation to a certain context such as a technical field, or relation to some dialects or manner of pronunciation.

A potential technical effect of the disclosed subject matter is a speech recognition system or an apparatus adapted by a language model to recognize words peculiar to certain context and/or dialects.

A general non-limiting overview of practicing the present disclosure is presented below. The overview outlines exemplary practice of embodiments of the present disclosure, providing a constructive basis for variant and/or alternative and/or divergent embodiments.

FIG. 1 schematically illustrates a system 100 for adapting a speech recognition system for out-of-vocabulary words, according to exemplary embodiments of the disclosed subject matter.

Speech signals in an audio database, denoted also as speech 110, are provided to a hybrid speech recognition engine, denoted also as hybrid speech recognition 132.

Hybrid speech recognition 132 generates transcripts of words and sub-words, denoted also as hybrid transcriptions 102. Additionally, hybrid speech recognition 132 records or otherwise tracks the locations of segments in speech 110 corresponding to transcriptions in hybrid transcriptions 102 such as timings or offsets or indexes, the locations in speech 110 are referred to also as audio indexes 104.

Audio indexes 104 may be constructed in any suitable manner, such as time stamps of segments in speech 110 or as indexes to segments in speech 110.

Hybrid transcriptions 102 are provided to a patterns extractor, denoted also as patterns extractor 134, which identifies and extracts patterns or sequences of sub-words in hybrid transcriptions 102. Further, patterns extractor 134 converts sequences of sub-words in hybrid transcriptions 102 to corresponding sequences of phonemes and generates a set or a collection of sub-words patterns as sequences or patterns of phonemes, denoted also as patterns set 106. Yet further, patterns extractor 134 extracts sequences of sub-words, either from hybrid transcriptions 102 or patterns set 106, as sub-sequences having a length equal or greater than a certain length as a length threshold, denoted as L, and adds the sub-sequences as sub-sequences of phonemes to patterns set 106.

For example, assuming that L is 5, and a graphemic sequence S0 as S0: _A_B_C_D_E_F is found in patterns set 106. Consequently, two graphemic sub-sequences S1 and S2 of length 5 as S1: _A_B_C_D_E and S2: _B_C_D_E_F are extracted and added to patterns set 106.

Optionally, patterns set 106 are stored in a construct, such as a database, suitable for convenient identification of and access to sub-words patterns.

The conversion of sub-words in hybrid transcriptions 102 to corresponding sequences of phonemes is carried out by concatenating the sub-words representation as phoneme sequence to a unified sequence of phonemes.

Patterns set 106 are provided to a patterns analyzer, denoted also as candidate patterns identifier 136, which identifies patterns, or candidate patterns, as candidates for representing out-of-vocabulary words, which are denoted also as candidate patterns 108. Being derived from patterns set 106 candidate patterns 108 are formed graphemically as phonemes sequence or patterns.

Candidate patterns 108 are determined based on the repetitions of a phoneme pattern in the transcriptions DB having repetitions as equal as or greater than a repetition threshold denoted as T, while excluding patterns having repetitions less than T and in-vocabulary words as phoneme patterns that already represent in-vocabulary words such as found in a phonetic dictionary, for instance a phonetic dictionary used in hybrid speech recognition 132. In some embodiments, non-words, such as certain phoneme patterns that are in advance determined as 'non-words' are also excluded as found, for example, in a provided dictionary that catalogs or lists non-words.

Table-1 below, by way of example, graphemically lists patterns and repetitions or counts thereof.

TABLE 1

| | Pattern | Count |
|---|---|---|
| 1: | _L_EH_B_OH_R | 3 |
| 2: | _B_OH_R | 2 |
| 3: | _B_OH_R_D_ER | 1 |
| 4: | _B_R_UH_T | 1 |

Thus, assuming that T is 2 then patterns in rows 3-4, being less than T, are excluded from candidate patterns 108.

Candidate patterns 108 along with audio indexes 104, or at least portions of audio indexes 104 that correspond to candidate patterns 108, are provided to an audio sounder, denoted also as audio presenter 142, which audibly sounds or presents the segments in speech 110 according to audio indexes 104. The segments in speech 110 are sounded by a suitable apparatus comprising a device such as a loudspeaker or earphones, collectively and schematically illustrated as a speaker 146.

A person, as a 'teacher' or an 'appraiser', denoted also as an appraiser 144, listens to the speech segments, and judges or decides or determines which of the sounds corresponding to patterns or sequences in candidate patterns 108 are perceived as valid distinct out-of-vocabulary words.

Candidate patterns decided as valid words by appraiser 144 are provided by appraiser 144 as out-of-vocabulary words, denoted also as out-of-vocabulary potential words 112. For example, patterns judged as non-valid are discarded or ignored, thus leaving and maintaining only the valid patterns, such as patterns tagged or designated as such by certain metadata attribute. Additionally, candidate patterns that constitute known words, such as in a phonetic dictionary cited above, are also discarded from out-of-vocabulary potential words 112, as such words are in fact in-vocabulary words rather than out-of-vocabulary words.

The output from audio presenter 142 is also a reduced set of phoneme patterns from candidate patterns 108 so that the reduced set includes phoneme patterns corresponding to the out-of-vocabulary potential words 112. The reduced set of phonemes patterns is also referred to as a reduced set 164.

It is noted that being derived from candidate patterns 108 out-of-vocabulary potential words 112 are formed as phonemes sequence or patterns.

It is also noted that, at least in certain cases and/or embodiments, appraiser 144 is familiar with the vocabulary and/or peculiarities of words or terms in the context of speech 110. For example, a context of some dialect or pronunciations or a profession or a business.

Out-of-vocabulary potential words 112 are provided to a speech recognition adapter and/or trainer, denoted also as a speech recognition adapter 138, which amends or trains the speech recognition components, including at least a baseline language model, denoted also as a baseline LM 166. Speech recognition adapter 138 generates a speech recognition such as a speech recognition engine, denoted as adapted speech recognition 114, which is adapted to recognize out-of-vocabulary potential words 112. It is noted that, based on the speech recognition components that includes the baseline language model, speech recognition adapter 138 generates a speech that is adapted to recognize terms or words such as from the baseline language model, in addition to out-of-vocabulary potential words 112 so that the generated speech recognition is adapted for an extended vocabulary than includes both of in-vocabulary and out-of-vocabulary terms or words.

In some embodiments, repeated patterns in out-of-vocabulary potential words 112 are searched for to identify and/or retrieve textual words matching to the patterns. The identified textual words are used to amend or train the speech recognition components to generate adapted speech recognition 114.

The textual words may be found and identified, at least partly, in a sufficiently rich resource or resources of textual content such as the Web or public repositories of textual data.

For example, given a provided language model such as a baseline language model and a provided phonetic dictionary, such as used in hybrid speech recognition 132, the phonetic dictionary is updated with identified matching words and pronunciation thereof, such as from TTP or corresponding pattern in out-of-vocabulary potential words 112. Correspondingly, the language model is adapted or trained with text that includes the identified out-of-vocabulary words.

Thus, when the language model and phonetic dictionary are employed in a speech recognition system or apparatus with a speech that includes out-of-vocabulary words, the out-of-vocabulary words would be recognized, and that in addition to general words or phrases.

In some embodiments, hybrid speech recognition 132 is adapted based on a separate baseline language model and phonetic dictionary.

Training or amending speech recognition is generally known in the art. Examples of such training can be found also in U.S. application Ser. No. 14/307,520, 14/224,086 and 14/198,600 sharing the same applicant as of the present application.

Adapted speech recognition 114 that was generated by speech recognition adapter 138 is, at least principally, adequate for recognizing speech that include terms in out-of-vocabulary potential words 112.

Yet, the training by speech recognition adapter 138 might not be sufficiently adequate for out-of-vocabulary terms.

Therefore, to check whether the training by speech recognition adapter 138 is adequate, speech 110 is decoded by adapted speech recognition 114 at least in segments of speech 110 indicated by audio indexes 104 where out-of-vocabulary sub-words was found.

Thus, as schematically illustrated in FIG. 1, adapted speech recognition 114 together with audio indexes 104 are provided to a validation analyzer, denoted also as validator 162, that uses adapted speech recognition 114 and audio indexes 104 to decode speech 110 at and/or around the speech segments according to audio indexes 104 according to audio indexes 104 which correspond to the OOV potential words 112.

In case the number of recognized utterances of out-of-vocabulary words relative to total number of out-of-vocabulary utterances in speech 110 which include out-of-vocabulary potential words 112 is equal or above a certain threshold, denoted also as K, validator 162 determines that adapted speech recognition 114 is sufficiently and/or practically adequate for out-of-vocabulary terms.

Otherwise, speech recognition adapter 138 is invoked once and/or repeatedly using higher significance of the adaptation text resources, such as by higher interpolation weights relative to weights in a provided baseline language model or an adapted language model, until the number of recognized out-of-vocabulary terms relative to the number of out-of-vocabulary utterances in speech 110 is equal or above K. In some embodiments, a limit is set to the number of repetitious, and when that number is exhausted validator 162 determines that adapted speech recognition 114 is adequate, at least under the prevailing circumstance.

Thus, when the number of recognized out-of-vocabulary terms relative to the number of out-of-vocabulary utterances in speech 110 is equal or above K, the speech recognition components and particularly the language model thereof are considered to be better than the case when the number of recognized out-of-vocabulary terms relative to the number of out-of-vocabulary utterances in speech 110 is below K.

For example, in case of adaptation by interpolation between a baseline language model and a language model is constructed from the text resource, the interpolation weight of the language model including the newly identified out-of-vocabulary words of adapted speech recognition 114 is increased or refined by a predefined and/or a determined amount. Thereafter the refined language model is used to generate a new hybrid recognition system as adapted speech recognition 114.

In some embodiments, validator 162 employs randomly selected documents having out-of-vocabulary terms that were added to the new model and speech having repetitions of out-of-vocabulary terms, and validator 162 checks whether out-of-vocabulary terms are recognized at least a certain times, denoted also as N. if the refined recognition does not recognize out-of-vocabulary terms above N, then adapted speech recognition 114 is further refined and/or adapted until sufficient number of words are recognized relative to sub-words. If that case is not reached, provided also that the further textual words used to train adapted speech recognition 114, the refinements of adapted speech recognition 114 are revoked.

Unsupervised validation is generally known in the art. Examples of such validations be found also in U.S. application Ser. Nos. 14/307,520, 14/224,086 and 14/198,600 sharing the same applicant as of the present application.

Having obtained hybrid transcriptions 102 and out-of-vocabulary potential words 112, it might be desirable and/or potentially beneficial at least optionally to update hybrid transcriptions 102 to include also out-of-vocabulary potential words 112, thus expanding the transcriptions with out-of-vocabulary terms such as for searching or speech decoding.

It is noted that patterns set 106 represent sections of hybrid transcriptions 102 in a phonetic form as described above and that out-of-vocabulary potential words 112 are already in a phonetic form as noted above.

In order to replace sequences or patterns of out-of-vocabulary potential words 112 in patterns set 106, terms in out-of-vocabulary potential words 112 are validated to be sufficiently credible to replace patterns in patterns set 106 with corresponding sequences in out-of-vocabulary potential words 112.

Credibility of terms in out-of-vocabulary potential words 112 is determined based on a condition of a metric with respect to pronunciations of terms in a given repository that practically holds all known terms and their pronunciations, generally sorted from the most likely to the least likely. Such a repository may be obtained from public or academic sources such as from dictionaries. In case terms do not have a corresponding pronunciation, a TTP process may be used to furnish the pronunciations.

Exemplary excerpts from such a repository are demonstrated in Table-2 below.

TABLE 2

| Phrase | Pronunciation |
| --- | --- |
| ACTRESS(01) | _AE_K_T_R_IH_S |
| ACTRESS'S(01) | _AE_K_T_R_IH_S_IH_Z |
| ACTRESSES(01) | _AE_K_T_R_IH_S_IH_Z |
| ... | ... |
| ACTUALLY(01) | _AE_K_CH_AX_L_IY |
| ACTUALLY(02) | _AE_K_CH_UH_L_IY |
| ACTUALLY(03) | _AE_K_CH_UW_AX_L_IY |
| ... | ... |

The Phrase column lists words with relative likelihoods in parenthesis and the Pronunciation column lists the corresponding pronunciations as graphemes. The ellipses indicate gaps.

The metric is based on methods of the art, such as Minimum Edit distance described for example in http://sail.usc.edu/~audhkhas/docs/audhkhasi_kws_icassp07.pdf.

Referring again to FIG. 1, accordingly, as schematically illustrated by an arrow 158, out-of-vocabulary potential words 112, reduced set 164 and a pronunciations repository as described above, denoted also as a repository 156, are provided to a transcripts updater, denoted also as transcripts updater 152.

Transcripts updater 152 checks the terms in reduced set 164 against repository 156, and terms that meet a metric condition with respect to pronunciations in repository 156, such as a sufficiently small phonetic distance, are replaced in hybrid transcriptions 102, thus generating updated transcriptions, denoted also as updated transcriptions 154.

The dashed elements indicate optional elements as updating the transactions is only an optional operation.

It is noted, again, that reduced set 164, patterns set 106 and repository 156 comprise and/or represented by phonemes as graphemes or in any suitable form.

Speech recognition 132 and/or patterns extractor 134 and/or candidate patterns identifier 136 and/or speech recognition adapter 138 and/or validator 162 and/or transcripts updater 152 are components operated by an at least one computerized apparatus. The components may be constructed separately such as separate modules, and may be, at least partly, combined.

Threshold described above may be set and/or determined for tuning the operation of system 100, and are not limited to the values exemplified above. Generally, without limiting, L is in an order of 5 to 10, and T is in an order of 10 to 100.

Evidently, a condition of a value being equal or above a threshold is equivalent to a condition of a value being above a corresponding different threshold.

FIG. 2 outlines operations 200 for adapting a speech recognition system for out-of-vocabulary words, according to exemplary embodiments of the disclosed subject matter.

In operation 202 a speech in a sufficiently large corpus of speech is decoded by a hybrid speech recognition, thereby generating transcription having sequences of unrecognized sub-words that are subsequently converted to phoneme sequences by a process of concatenation of the phoneme representation of each sub-word and further recognized words while keeping a time track of the decoded segments of the speech such as by timings or offsets or indexes.

It is noted that corpus of speech is directed, at least partly, to a certain topic and/or context, such as of a business in a certain locality, thus including out-of-vocabulary terms.

In operation 204 graphemic sequences of sub-words as candidate out-of-vocabulary words are converted to phonemes and concatenated to form a unified sequences of phonemes.

Subsequently sequences of phonemes are determined as candidate out-of-vocabulary patterns. The determination is based on conditions as to the minimal lengths of a phonemes sequence and number of repetitions of the sequences.

For example, phoneme sequences or patterns that appear only once or sporadically or determined as too few are not considered as candidate for out-of-vocabulary as such sub-words are perceived or determined as insignificant or unimportant.

Likewise, phoneme sequences or patterns which are determined as too short are not considered as candidate for out-of-vocabulary as such patterns are perceived or determined, at least probably, as too frequent to be of significance, such as transitory words or phrases.

In operation 206 audibly presenting to a user the candidate out-of-vocabulary patterns from the speech according to the time track. The user decides the words that perceived and/or understood as distinct valid out-of-vocabulary words, neglecting or ignoring utterances perceived as nonsensical or 'gibberish'. In other words, the user decides which audio section correspond to valid out-of-vocabulary words In operation 208 a speech recognition is trained with the decided valid out-of-vocabulary words and/or with textual terms corresponding to the decided valid words.

In some embodiments, the speech recognition is trained with the decided valid out-of-vocabulary words, where optionally and additionally the speech recognition is trained or adapted to include recognition terms as in-vocabulary words or terms.

In some embodiments, a baseline model and other components of speech recognition are trained anew to generate a hybrid and/or word-based speech recognition adapted for recognition of out-of-vocabulary terms. Optionally or alternatively, the hybrid speech recognition of operation 202 is adapted with the decided valid words and/or with textual terms corresponding to the decided valid words.

In operation 212, at least optionally, the trained speech recognition is validated for a determined adequate performance of out-of-vocabulary words. For example, the validation is based on the number of recognized out-of-vocabulary terms relative to the number of out-of-vocabulary utterances. In case the trained speech recognition is determined to be of inadequate performance, the trained speech recognition is further trained or amended, at least to some extent.

It is noted that operations 204 and operation 206, at least potentially, are perceived as a unique and distinctive operations where the rest of operations 200 are known in the art in some variations. Having state that, the combination of operations 200 in conjunction of operation 204 and operation 206 is unique and distinctive.

There is thus provided according to the present disclosure a method for adapting a speech recognition system for out-of-vocabulary, comprising, decoding by a hybrid speech recognition a speech including out-of-vocabulary terms, thereby generating graphemic transcriptions of the speech with a mixture of recognized in-vocabulary words and unrecognized sub-words, while keeping a time track of the decoded segments of the speech, determining in the transcription sequences of sub-words as candidate patterns representing out-of-vocabulary words based on a first condition with respect to the number of phonemes of the sequences of sub-words and a second condition with respect to the number of repetitions of the sequences, audibly presenting to a user the candidate out-of-vocabulary patterns from the corresponding segments of the speech according to the time track, and receiving from the user indications of valid audio sections corresponding to audible presentations of the sequences of sub-words in the candidate out-of-vocabulary audio sections, and training a speech recognition system according to the candidate out-of-vocabulary words, thereby adapting the speech recognition to additionally recognize out-of-vocabulary words, wherein the method is performed on an at least one computerized apparatus configured to perform the method.

In some embodiments, the first condition with respect to the number of phonemes in a sequence or pattern comprises a first threshold above which the sequences are determined as candidate out-of-vocabulary patterns.

In some embodiments, the second condition with respect to the number of repetitions of the sequences comprises a second threshold above which the sequences are determined as candidate out-of-vocabulary patterns.

In some embodiments, training the speech recognition comprises training the hybrid speech recognition or word-based speech recognition.

In some embodiments, the method further comprises validation the trained speech recognition by determining an adequate performance of the trained speech recognition in recognizing of out-of-vocabulary words.

In some embodiments, the validation comprises at least one further amendment of the trained speech recognition to achieve an adequate performance of the trained speech recognition in recognizing of out-of-vocabulary words.

There is thus further provided according to the present disclosure an apparatus for configured to carry out the method.

In the context of some embodiments of the present disclosure, by way of example so and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for so achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for adapting a speech recognition system for out-of-vocabulary words, comprising:
   decoding by a hybrid speech recognition a speech including out-of-vocabulary terms, thereby generating graphemic transcriptions of the speech with a mixture of recognized in-vocabulary words and unrecognized sub-words, while keeping a time track of the decoded segments of the speech;
   converting the sub-words to patterns comprising a set of phoneme sequences by a process of concatenation of a phoneme representation of each sub-word;
   subsequently, determining among the patterns, which patterns are candidate to represent out-of-vocabulary words based on a first condition with respect to the lengths of the pattern based on a number of phonemes and a second condition with respect to the number of repetitions of the pattern;
   audibly presenting to a user the candidate patterns representing out-of-vocabulary words from the corresponding segments of the speech according to the time track, and receiving from the user indications of valid out-of-vocabulary words responsive to the audible presentations of the candidate patterns; and training a speech recognition system to additionally recognize the identified out-of-vocabulary words, thereby adapting the speech recognition to recognize out-of-vocabulary words, wherein the method is performed on an at least one computerized apparatus configured to perform the method.

2. The method according to claim 1, wherein the first condition with respect to lengths of the sequences measured as the number of phonemes, comprises a first threshold above which the sequences are determined as candidate out-of-vocabulary patterns.

3. The method according to claim 1, wherein the second condition with respect to the number of repetitions of the sequences comprises a second threshold above which the sequences are determined as candidate out-of-vocabulary patterns.

4. The method according to claim 1, wherein training the speech recognition system comprises training the hybrid speech recognition system or a word-based speech recognition system.

5. The method according to claim 1, further comprising validation of the trained speech recognition system by determining an adequate performance of the trained speech recognition system in recognizing of out-of-vocabulary words.

6. The method according to claim 5, wherein the validation comprises at least one further amendment of the trained speech recognition system to achieve an adequate performance of the trained speech recognition system in recognizing of out-of-vocabulary words.

7. A system for adapting a speech recognition system for out-of-vocabulary words, comprising:

at least one processor;

an audio database for storing and retrieving audio signals responsive to instructions from said processor;

an audio sounder configured to audibly present distinct segments of audio signals from said audio database responsive to instructions from said processor;

at least one program for execution on said processor to perform the following:

decoding by a hybrid speech recognition a speech including out-of-vocabulary terms, thereby generating graphemic transcriptions of the speech with a mixture of recognized in-vocabulary words and unrecognized sub-words, while keeping a time track of the decoded segments of the speech;

converting the sub-words to patterns comprising a set of phoneme sequences by a process of concatenation of a phoneme representation of each sub-word;

subsequently, determining among the patterns, which patterns are candidate to represent out-of-vocabulary words based on a first condition with respect to the lengths of the pattern based on a number of phonemes and a second condition with respect to the number of repetitions of the pattern;

audibly presenting to a user with the audio sounder the candidate patterns representing out-of-vocabulary words from the corresponding segments of the speech according to the time track, and receiving from the user indications of valid out-of-vocabulary words responsive to the audible presentations of the candidate patterns; and training a speech recognition system to additionally recognize the identified out-of-vocabulary words, thereby adapting the speech recognition to recognize out-of-vocabulary words.

* * * * *